(12) United States Patent
Zhang (10) Patent No.: US 9,049,580 B2
(45) Date of Patent: Jun. 2, 2015

(54) QUALCOMM CHAT MOBILE TERMINAL UPDATE AND AUTHENTICATION METHOD AND MOBILE TERMINAL

(71) Applicant: Huawei Device Co., Ltd., Shenzhen (CN)

(72) Inventor: Linlin Zhang, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/101,760

(22) Filed: Dec. 10, 2013

(65) Prior Publication Data

US 2014/0099927 A1    Apr. 10, 2014

Related U.S. Application Data (63) Continuation of application No. PCT/CN2012/081831, filed on Sep. 24, 2012.

(30) Foreign Application Priority Data

Sep. 26, 2011    (CN) .......................... 2011 1 0287865

(51) Int. Cl.
*H04M 1/725*    (2006.01)
*H04W 8/18*    (2009.01)
(Continued)

(52) U.S. Cl.
CPC ......... *H04W 8/183* (2013.01); *H04L 29/08108* (2013.01); *H04W 12/02* (2013.01); *H04L 63/08* (2013.01); *H04W 4/003* (2013.01); *H04W 12/06* (2013.01); *H04W 4/001* (2013.01)

(58) Field of Classification Search
CPC ....... H04W 12/06; H04W 8/183; H04W 4/12; H04W 12/02; H04L 63/08; H04L 29/08108

USPC ........................... 455/410, 411, 412.1, 412.2
See application file for complete search history.

(56) References Cited

U.S. PATENT DOCUMENTS

| 2010/0029316 | A1  | 2/2010 | Kaushik |
| 2010/0248770 | A1* | 9/2010 | Shuman et al. ............... 455/518 |
| 2014/0112210 | A1* | 4/2014 | Zhang .......................... 370/260 |

FOREIGN PATENT DOCUMENTS

| CN | 1780453 A | 5/2006 |
| CN | 101400121 A | 4/2009 |

(Continued)

OTHER PUBLICATIONS

Foreign Communication From A Counterpart Application, Chinese Application No. 201110287865.7, Chinese Search Report dated May 27, 2013, 6 pages.

(Continued)

*Primary Examiner* — Khalid Shaheed
(74) *Attorney, Agent, or Firm* — Conley Rose, P.C.; Grant Rodolph; Nicholas K. Beaulieu (57) ABSTRACT

A QUALCOMM chat (Qchat) mobile terminal update and authentication method and a mobile terminal are disclosed. A historical result of performing data update of a Qchat service is recorded in a preset storage location in a mobile terminal, and determines, according to the result, whether the Qchat service is activated in the current mobile terminal card. If the Qchat service is not activated, a data update process of the Qchat service is skipped, and a start-up procedure except the data update process of the Qchat service is directly executed, thereby effectively reducing an invalid tariff incurred to a non-Qchat mobile terminal card user during start-up; and meanwhile, normal use of a Qchat user is not affected and user experience is improved.

20 Claims, 5 Drawing Sheets

(51) Int. Cl.
*H04L 29/08* (2006.01)
*H04W 12/02* (2009.01)
*H04L 29/06* (2006.01)
*H04W 4/00* (2009.01)
*H04W 12/06* (2009.01)

(56) References Cited

FOREIGN PATENT DOCUMENTS

| CN | 101437279 A | 5/2009 |
| CN | 101651876 A | 2/2010 |
| CN | 102333283 A | 1/2012 |

OTHER PUBLICATIONS

Foreign Communication From A Counterpart Application, PCT Application No. PCT/CN2012/081831, English Translation of Chinese Search Report dated Jan. 3, 2013, 2 pages.
Foreign Communication From A Counterpart Application, PCT Application No. PCT/CN2012/081831, English Translation of Chinese Written Opinion dated Jan. 3, 2013, 6 pages.

\* cited by examiner

QUALCOMM CHAT MOBILE TERMINAL UPDATE AND AUTHENTICATION METHOD AND MOBILE TERMINAL

CROSS-REFERENCE TO RELATED APPLICATIONS

This application is a continuation of International Application No. PCT/CN2012/081831, filed on Sep. 24, 2012, which claims priority to Chinese Patent Application No. 201110287865.7, filed on Sep. 26, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a QUALCOMM chat (QCHAT) (i.e., telecommunication services providing for two-way or group communications through the use of telephones, wireless telephones, personal data assistants, and computers) mobile terminal update and authentication method and a mobile terminal.

BACKGROUND

QCHAT is a cluster communication technology based on a mobile network, which may provide functions such as single call, group call, emergency call, broadcast call, and call priority. QCHAT supports one-to-one and one-to-many half-duplex radio voice communication, and is a solution to cluster communication on a third generation mobile communication network. Its features lie in that: response is quick (call establishment time is shorter than 1 second (s)), efficiency is high, stability and reliability are desirable, and a half-duplex mechanism is adopted, that is, at the same time, only one person has the right to speak and can speak.

However, in a process of implementing the present invention, the inventor finds that the prior art has at least the following problems:

A QCHAT service is implemented based on a packet data service, and therefore, a mobile terminal that has a QCHAT function (especially, a QCHAT mobile phone) needs to perform data update during start-up. Certain traffic expense is incurred when obtaining information such as group information and configuration data from a network is completed during the data update, which means a unified tariff for a QCHAT user, and this part of traffic affects a user tariff slightly. However, for a common user (a user that uses a QCHAT mobile terminal, but a QCHAT service is not activated in an inserted mobile terminal card), the following problems exist: the mobile terminal may still apply to the network for updating relevant group data in a start-up process, and in a whole procedure, charging is started after packet data serving node (PDSN) authentication succeeds. At this time, the mobile terminal requests for data update. However, because a QCHAT service is not activated in a current mobile terminal card, a QCHAT server refuses an update request, but traffic expense is incurred in this procedure. Especially, in a place where no QCHAT server is deployed, the mobile terminal keeps sending a request after the request expires. If the number of requesting times is greater than 10, more traffic expense is incurred and more time is occupied. The foregoing traffic expense is incurred during each time of start-up for a common user, and start-up and shutting-down are frequent operations of the user. Therefore, an existing QCHAT mobile terminal incurs a large number of invalid tariffs to the common user.

SUMMARY

To solve a problem that an existing QCHAT (i.e., telecommunication services providing for two-way or group communications through the use of telephones, wireless telephones, personal data assistants, and computers) mobile terminal incurs a large number of invalid tariffs to a common user, embodiments of the present invention provide a QCHAT mobile terminal update and authentication method and a mobile terminal. The technical solutions are as follows:

A QCHAT mobile terminal update and authentication method is provided, where the method includes: when a mobile terminal starts up and a mobile terminal card is not replaced, reading a preset storage location in the mobile terminal; when a historical result of performing data update of a QCHAT service is recorded in the preset storage location, determining, according to the historical result of performing data update of the QCHAT service, where the historical result is recorded in the preset storage location, whether the QCHAT service is activated in the current mobile terminal card in the mobile terminal; and when the QCHAT service is not activated in the current mobile terminal card, executing a start-up procedure except a data update process of the QCHAT service.

A mobile terminal is provided, where the mobile terminal includes: a reading module configured to: when the mobile terminal starts up and a mobile terminal card is not replaced, read a preset storage location in the mobile terminal; a first determining module configured to: when a historical result of performing data update of a QCHAT service is recorded in the preset storage location, determine, according to the historical result of performing data update of the QCHAT service, where the historical result is recorded in the preset storage location, whether the QCHAT service is activated in the current mobile terminal card in the mobile terminal; and a start-up module configured to: when the first determining module determines that the QCHAT service is not activated in the current mobile terminal card, execute a start-up procedure except a data update process of the QCHAT service.

Beneficial effects of the technical solutions provided in the embodiments of the present invention are that: a historical result of performing data update of a QCHAT service is recorded in a preset storage location of a mobile terminal, so that each time when the mobile terminal starts up and a mobile terminal card is not replaced, the mobile terminal may need to read, at the preset location, only the historical result of performing data update of the QCHAT service, and determines, according to the historical result, whether the QCHAT service is activated in the current mobile terminal card. If the QCHAT service is not activated, a data update process of the QCHAT service is skipped, and a start-up procedure except the data update process of the QCHAT service is directly executed, thereby effectively reducing an invalid tariff incurred to a non-QCHAT mobile terminal card user during start-up; and meanwhile, normal use of a QCHAT user is not affected and user experience is improved.

BRIEF DESCRIPTION OF THE DRAWINGS

To describe the technical solutions in the embodiments of the present invention more clearly, the accompanying drawings required for describing the embodiments of the present invention are briefly introduced in the following. The accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the present invention more comprehensible, the embodiments of the present invention are described in further detail in the following with reference to the accompanying drawings.

Embodiment 1

Figure 1:
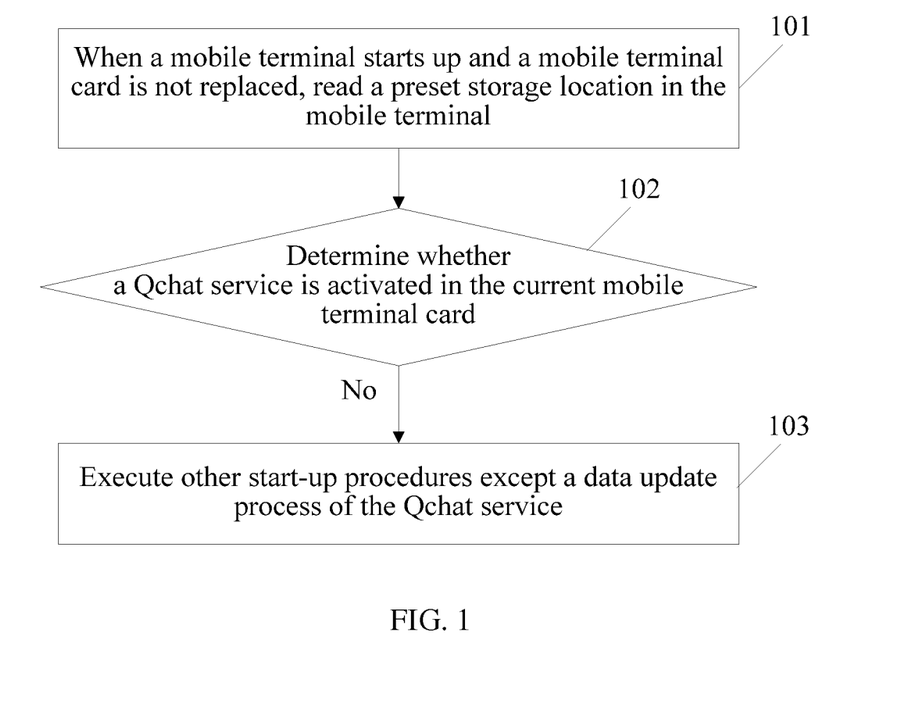
FIG. 1 is a schematic flow chart of a QCHAT mobile terminal update and authentication method according to Embodiment 1 of the present invention.

As shown in FIG. 1, this embodiment provides a QCHAT mobile terminal update and authentication method, where the method specifically includes:

101: When a mobile terminal starts up and a mobile terminal card is not replaced, read a preset storage location in the mobile terminal.

102: When a historical result of performing data update of a QCHAT service is recorded in the preset storage location, determine, according to the historical result of performing data update of the QCHAT service, where the historical result is recorded in the preset storage location, whether the QCHAT service is activated in the current mobile terminal card; and if the QCHAT service is not activated in the current mobile terminal card, execute step 103.

103: Execute a start-up procedure except a data update process of the QCHAT service.

With the QCHAT mobile terminal update and authentication method provided in this embodiment, a historical result of performing data update of a QCHAT service is recorded in a preset storage location in a mobile terminal, so that when the mobile terminal starts up, the mobile terminal may need to read, at the preset location, only the historical result of performing data update of the QCHAT service, and determines, according to the historical result, whether the QCHAT service is activated in a current mobile terminal card. If the QCHAT service is not activated, a data update process of the QCHAT service is skipped, and other start-up procedures except the data update process of the QCHAT service are directly executed, thereby effectively reducing an invalid tariff incurred to a non-QCHAT mobile terminal card user during start-up; and meanwhile, normal use of a QCHAT user is not affected and user experience is improved.

Embodiment 2

Figure 2:
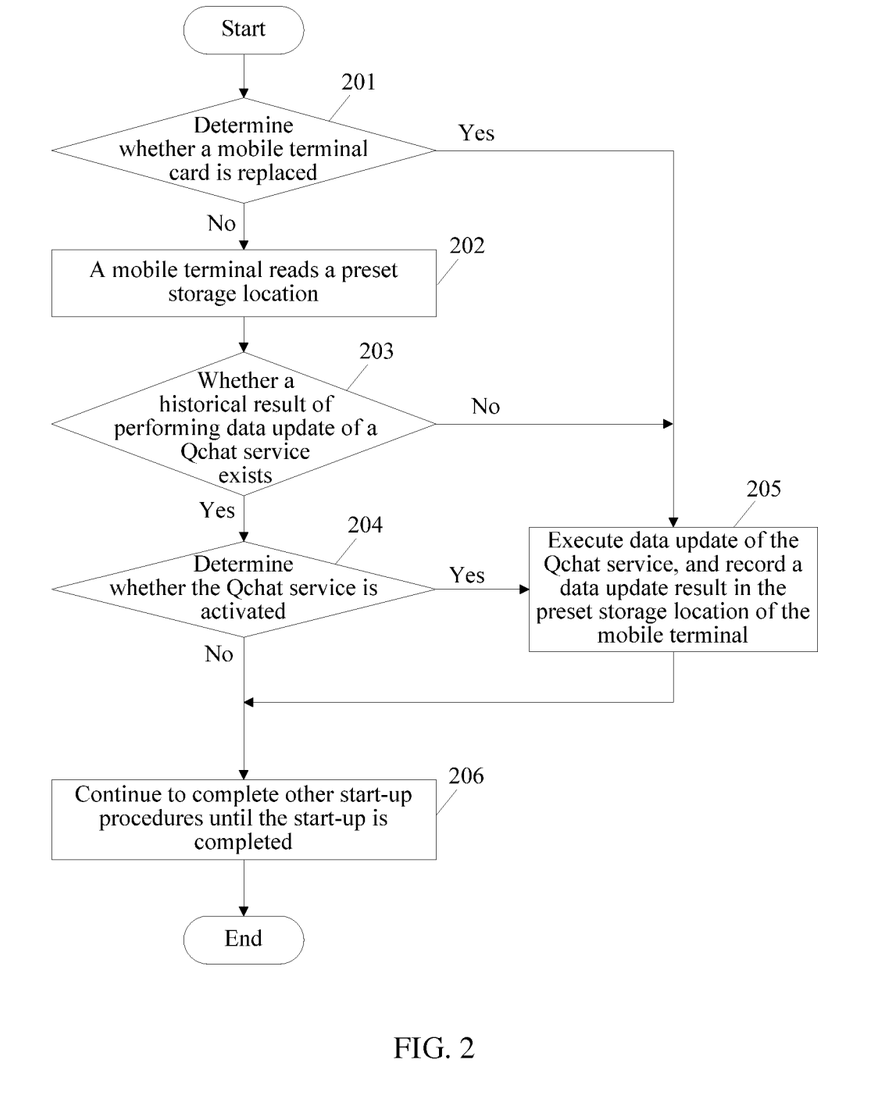
FIG. 2 is a schematic flow chart of a QCHAT mobile terminal update and authentication method according to Embodiment 2 of the present invention.

As shown in FIG. 2, this embodiment provides a QCHAT mobile terminal update and authentication method, which is improved on the basis of Embodiment 1, and the method specifically includes:

201: When a mobile terminal of a user starts up, determine whether a mobile terminal card is replaced. If not, execute step 202, and if yes, execute step 205.

It should be noted that, in this embodiment, a used mobile terminal is a QCHAT mobile terminal, where the QCHAT mobile terminal is an executive subject of the method provided in this embodiment, and the mobile terminal card is a subscriber identity module (SIM) card or a user identity module (UIM) card.

202: The mobile terminal reads a preset storage location.

In this embodiment, the preset storage location specifically is an embedded file system (EFS) of the mobile terminal. When the mobile terminal is manufactured, data in the EFS is empty, and each time after the mobile terminal card performs data update of a QCHAT service, a data update result is obtained: update success, authentication failure, or no change. After the mobile terminal obtains the update result, the update result is recorded in the EFS of the mobile terminal, may serve as a historical result of performing data update of the QCHAT service, and may be used when the mobile terminal performs update and authentication later.

It should be noted that, when the mobile terminal does not perform data update of the QCHAT service, data in the EFS is empty.

203: Determine whether a historical result of performing data update of the QCHAT service exists in the preset storage location. If yes, execute step 204, and if not, execute step 205.

204: Determine, according to the historical result of performing data update of the QCHAT service, whether the QCHAT service is not activated in the current mobile terminal card. If yes, execute step 205, and if not, execute step 206.

Specifically, when the historical result of performing data update of the QCHAT service, which is recorded in the EFS, is update success or no change, the QCHAT service is activated in the current mobile terminal card; and when the historical result of performing data update of the QCHAT service, which is recorded in the EFS, is authentication failure, the QCHAT service is not activated in the current mobile terminal card.

205: Execute data update of the QCHAT service, record a data update result in the preset storage location of the mobile terminal, and execute step 206.

206: Continue to complete other start-up procedures until the start-up is completed.

It should be noted that, in this embodiment, other start-up procedures refer to start-up procedures, except the data update of the QCHAT service, among start-up procedures, for example, requesting a network side to allocate a channel, selecting a cell, and performing location update, which are the prior art and are not described herein again.

With the QCHAT mobile terminal update and authentication method provided in this embodiment, a historical result of performing data update of a QCHAT service is recorded in a preset storage location in a mobile terminal, so that each time when the mobile terminal starts up and a mobile terminal card is not replaced, the mobile terminal may need to read, at the preset location, only the historical result of performing data update of the QCHAT service, and determines, according to the historical result, whether the QCHAT service is activated in the current mobile terminal card. If the QCHAT service is not activated, a data update process of the QCHAT service is skipped, and other start-up procedures except the data update process of the QCHAT service are directly executed, thereby effectively reducing an invalid tariff incurred to a non-QCHAT mobile terminal card user during start-up; and meanwhile, normal use of a QCHAT user is not affected and user experience is improved.

Embodiment 3

Figure 3:
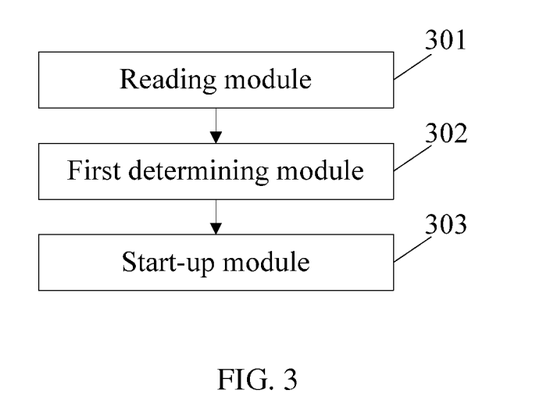
FIG. 3 is a schematic structural diagram of a mobile terminal according to Embodiment 3 of the present invention.

As shown in FIG. 3, this embodiment provides a mobile terminal, where the mobile terminal includes: a reading module 301 configured to: when the mobile terminal starts up and a mobile terminal card is not replaced, read a preset storage location in the mobile terminal; a first determining module 302 configured to: when a historical result of performing data update of a QCHAT service is recorded in the preset storage location, determine, according to the historical result of performing data update of the QCHAT service, where the historical result is recorded in the preset storage location, whether the QCHAT service is activated in the current mobile terminal card in the mobile terminal; and a start-up module 303 configured to: when the first determining module 302 determines that the QCHAT service is not activated in the current mobile terminal card, execute a start-up procedure except a data update process of the QCHAT service.

Figure 4:
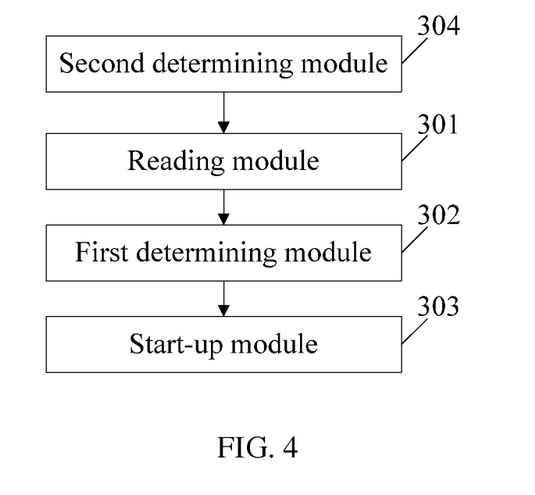
FIG. 4 is a second schematic structural diagram of a mobile terminal according to Embodiment 3 of the present invention.

Further, as shown in FIG. 4, the foregoing mobile terminal further includes: a second determining module 304 configured to: before the reading module reads the preset storage location in the mobile terminal, determine whether the mobile terminal card in the mobile terminal is replaced.

Figure 5:
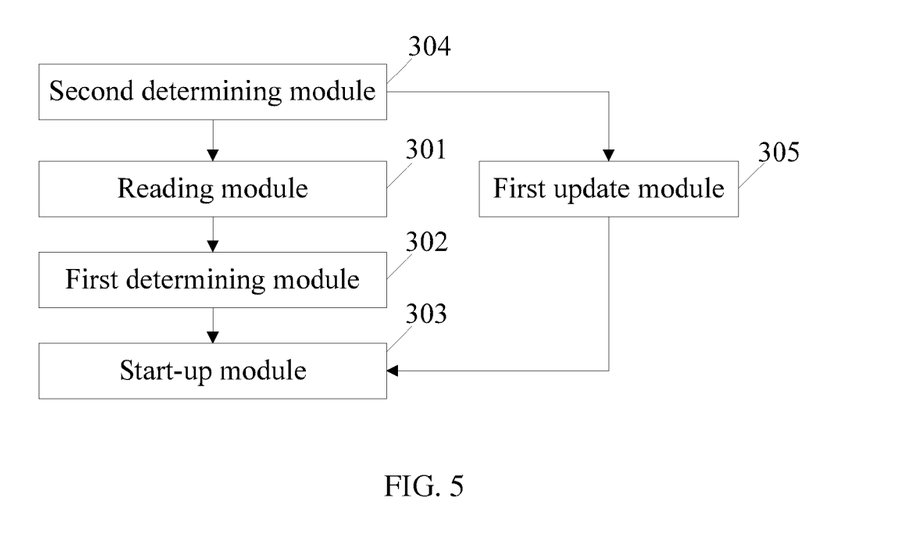
FIG. 5 is a third schematic structural diagram of a mobile terminal according to Embodiment 3 of the present invention.

Correspondingly, as shown in FIG. 5, the foregoing terminal further includes: a first update module 305 configured to: when the second determining module 304 determines that the mobile terminal card in the mobile terminal is replaced, perform data update of the QCHAT service, and record a data update result of the QCHAT service in the preset storage location of the mobile terminal.

Figure 6:
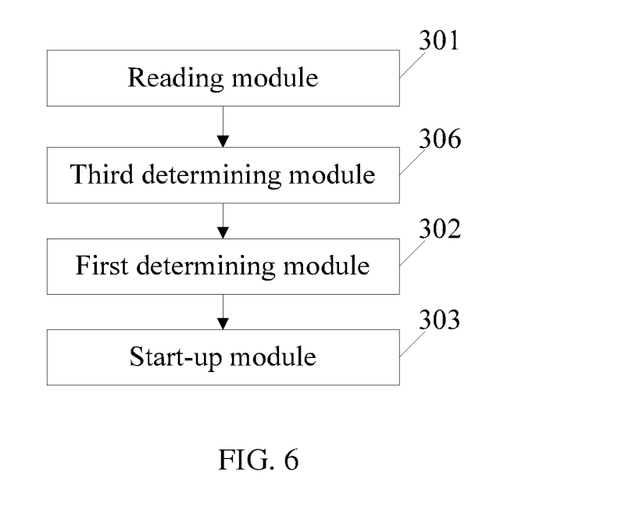
FIG. 6 is a fourth schematic structural diagram of a mobile terminal according to Embodiment 3 of the present invention.

Further, as shown in FIG. 6, the foregoing mobile terminal further includes: a third determining module 306 configured to: before the first determining module 302 determines, according to the historical result of performing data update of the QCHAT service, where the historical result is recorded in the preset storage location, whether the QCHAT service is activated in the current mobile terminal card in the mobile terminal, determine whether the historical result of performing data update of the QCHAT service is recorded in the preset storage location.

Figure 7:
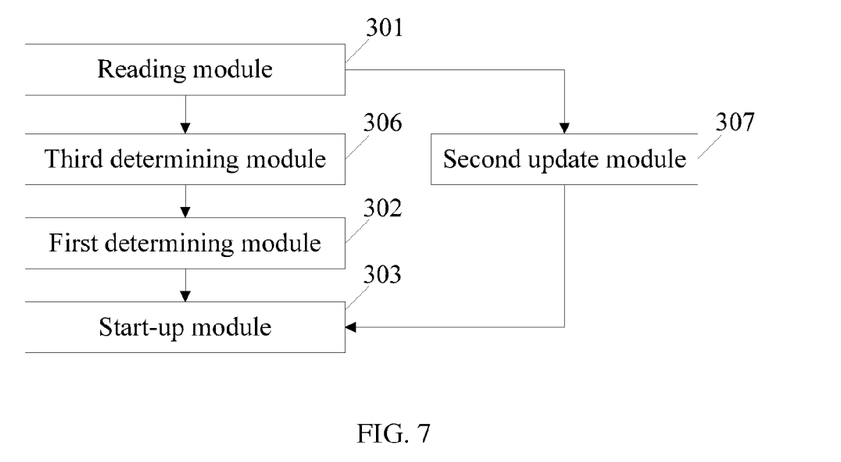
FIG. 7 is a fifth schematic structural diagram of a mobile terminal according to Embodiment 3 of the present invention.

Correspondingly, as shown in FIG. 7, the foregoing mobile terminal further includes: a second update module 307 configured to: when the third determining module 306 determines that the historical result of performing data update of the QCHAT service is not record in the preset storage location, perform data update of the QCHAT service, and record a data update result of the QCHAT service in the preset storage location.

Figure 8:
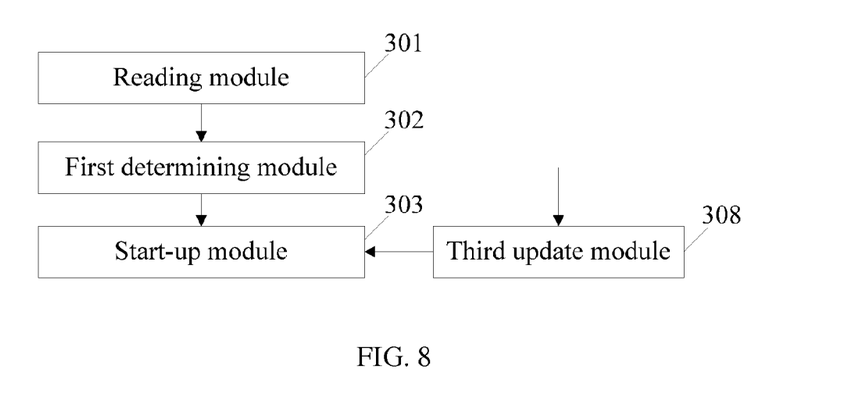
FIG. 8 is a sixth schematic structural diagram of a mobile terminal according to Embodiment 3 of the present invention.

Further, as shown in FIG. 8, the foregoing mobile terminal further includes: a third update module 308 configured to: when the first determining module 302 determines that the QCHAT service is activated in the current mobile terminal card, perform data update of the QCHAT service, and record a data update result of the QCHAT service in the preset storage location.

With the mobile terminal provided in this embodiment, a historical result of performing data update of a QCHAT service is recorded in a preset storage location in a mobile terminal, so that each time when the mobile terminal starts up and a mobile terminal card is not replaced, the mobile terminal may need to read, at the preset location, only the historical result of performing data update of the QCHAT service, and determines, according to the result, whether the QCHAT service is activated in the current mobile terminal card. If the QCHAT service is not activated, a data update process of the QCHAT service is skipped, and other start-up procedures except the data update process of the QCHAT service are directly executed, thereby effectively reducing an invalid tariff incurred to a non-QCHAT mobile terminal card user during start-up; and meanwhile, normal use of a QCHAT user is not affected and user experience is improved.

Persons of ordinary skill in the art may understand that all or a part of the steps of the foregoing embodiments may be implemented through hardware, or may be implemented by a program instructing relevant hardware. The program may be stored in a computer readable storage medium. The foregoing storage medium may be a read-only memory, a magnetic disk, an optical disk, or the like.

The foregoing descriptions are merely exemplary embodiments of the present invention, but are not intended to limit the present invention. Any modification, equivalent replacement, or improvement made within the spirit and principle of the present invention shall all fall within the protection scope of the present invention.

What is claimed is:

1. A QUALCOMM chat (QCHAT) mobile terminal update and authentication method, comprising:
   when a mobile terminal starts up and a mobile terminal card is not replaced, reading by the mobile terminal a preset storage location in the mobile terminal;
   when a historical result of performing data update of a QCHAT service is recorded in the preset storage location, determining by the mobile terminal, according to the historical result of performing data update of the QCHAT service, wherein the historical result is recorded in the preset storage location, whether the QCHAT service is activated in the current mobile terminal card in the mobile terminal; and
   when the QCHAT service is not activated in the current mobile terminal card, executing by the mobile terminal a start-up procedure except a data update process of the QCHAT service.

2. The method according to claim 1, wherein before reading by the mobile terminal the preset storage location in the mobile terminal, the method further comprises:
   determining by the mobile terminal whether the mobile terminal card in the mobile terminal is replaced; and
   when the mobile terminal card in the mobile terminal is replaced, performing by the mobile terminal data update of the QCHAT service, and recording by the mobile terminal a data update result of the QCHAT service in the preset storage location of the mobile terminal.

3. The method according to claim 1, wherein before determining by the mobile terminal, according to the historical result of performing data update of the QCHAT service, wherein the historical result is recorded in the preset storage location, whether the QCHAT service is activated in the current mobile terminal card in the mobile terminal, the method further comprises determining by the mobile terminal whether the historical result of performing data update of the QCHAT service is recorded in the preset storage location.

4. The method according to claim 2, wherein before determining by the mobile terminal, according to the historical result of performing data update of the QCHAT service, wherein the historical result is recorded in the preset storage location, whether the QCHAT service is activated in the current mobile terminal card in the mobile terminal, the method further comprises determining by the mobile terminal whether the historical result of performing data update of the QCHAT service is recorded in the preset storage location.

5. The method according to claim 3, further comprising when the historical result of performing data update of the QCHAT service is not recorded in the preset storage location, performing by the mobile terminal data update of the QCHAT service, and recording by the mobile terminal a data update result of the QCHAT service in the preset storage location.

6. The method according to claim 1, wherein when the QCHAT service is activated in the current mobile terminal card, the method further comprises performing by the mobile terminal data update of the QCHAT service, and recording by the mobile terminal a data update result of the QCHAT service in the preset storage location.

7. The method according to claim 2, wherein when the QCHAT service is activated in the current mobile terminal card, the method further comprises performing by the mobile terminal data update of the QCHAT service, and recording by the mobile terminal a data update result of the QCHAT service in the preset storage location.

8. The method according to claim 3, wherein when the QCHAT service is activated in the current mobile terminal card, the method further comprises performing by the mobile terminal data update of the QCHAT service, and recording by the mobile terminal a data update result of the QCHAT service in the preset storage location.

9. The method according to claim 4, wherein when the QCHAT service is activated in the current mobile terminal card, the method further comprises performing by the mobile terminal data update of the QCHAT service, and recording by the mobile terminal a data update result of the QCHAT service in the preset storage location.

10. The method according to claim 5, wherein when the QCHAT service is activated in the current mobile terminal card, the method further comprises performing by the mobile terminal data update of the QCHAT service, and recording by the mobile terminal a data update result of the QCHAT service in the preset storage location.

11. A mobile terminal, comprising:
a reading module configured to: when the mobile terminal starts up and a mobile terminal card is not replaced, read a preset storage location in the mobile terminal;
a first determining module configured to: when a historical result of performing data update of a QUALCOMM chat (QCHAT) service is recorded in the preset storage location, determine, according to the historical result of performing data update of the QCHAT service, wherein the historical result is recorded in the preset storage location, whether the QCHAT service is activated in the current mobile terminal card in the mobile terminal; and
a start-up module configured to: when the first determining module determines that the QCHAT service is not activated in the current mobile terminal card, execute a start-up procedure except a data update process of the QCHAT service.

12. The mobile terminal according to claim 11, further comprising:
a second determining module configured to: before the reading module reads the preset storage location in the mobile terminal, determine whether the mobile terminal card in the mobile terminal is replaced; and
a first update module configured to: when the second determining module determines that the mobile terminal card in the mobile terminal is replaced, perform data update of the QCHAT service, and record a data update result of the QCHAT service in the preset storage location of the mobile terminal.

13. The mobile terminal according to claim 11, further comprising a third determining module configured to: before the first determining module determines, according to the historical result of performing data update of the QCHAT service, wherein the historical result is recorded in the preset storage location, whether the QCHAT service is activated in the current mobile terminal card in the mobile terminal, determine whether the historical result of performing data update of the QCHAT service is recorded in the preset storage location.

14. The method according to claim 12, wherein when the QCHAT service is activated in the current mobile terminal card, the method further comprises performing data update of the QCHAT service, and recording a data update result of the QCHAT service in the preset storage location.

15. The mobile terminal according to claim 13, further comprising a second update module configured to: when the third determining module determines that the historical result of performing data update of the QCHAT service is not recorded in the preset storage location, perform data update of the QCHAT service, and record a data update result of the QCHAT service in the preset storage location.

16. The mobile terminal according to claim 13, further comprising a third update module configured to: when the first determining module determines that the QCHAT service is activated in the current mobile terminal card, perform data update of the QCHAT service, and record a data update result of the QCHAT service in the preset storage location.

17. A non-transitory computer-readable medium having computer usable instructions stored thereon for execution by a processor, wherein the instructions cause the processor to:
when a mobile terminal starts up and a mobile terminal card is not replaced, read a preset storage location in the mobile terminal;
when a historical result of performing data update of a QUALCOMM chat (QCHAT) service is recorded in the preset storage location, determine, according to the historical result of performing data update of the QCHAT service, wherein the historical result is recorded in the preset storage location, whether the QCHAT service is activated in the current mobile terminal card in the mobile terminal; and
when the QCHAT service is not activated in the current mobile terminal card, execute a start-up procedure except a data update process of the QCHAT service.

18. The non-transitory computer-readable medium according to claim 17, wherein before the preset storage location in the mobile terminal is read, the instructions cause the processor to:
determine whether the mobile terminal card in the mobile terminal is replaced; and
when the mobile terminal card in the mobile terminal is replaced, perform data update of the QCHAT service, and record a data update result of the QCHAT service in the preset storage location of the mobile terminal.

19. The non-transitory computer readable medium according to claim 17, wherein before it is determined, according to the historical result of performing data update of the QCHAT service, wherein the historical result is recorded in the preset storage location, whether the QCHAT service is activated in the current mobile terminal card in the mobile terminal, the instructions cause the processor to determine whether the historical result of performing data update of the QCHAT service is recorded in the preset storage location.

20. The non-transitory computer readable medium according to claim 18, wherein before it is determined, according to the historical result of performing data update of the QCHAT service, wherein the historical result is recorded in the preset storage location, whether the QCHAT service is activated in the current mobile terminal card in the mobile terminal, the instructions cause the processor to determine whether the historical result of performing data update of the QCHAT service is recorded in the preset storage location.

\* \* \* \* \*